(12) United States Patent
Song et al.

(10) Patent No.: US 11,721,130 B2
(45) Date of Patent: Aug. 8, 2023

(54) WEAKLY SUPERVISED VIDEO ACTIVITY DETECTION METHOD AND SYSTEM BASED ON ITERATIVE LEARNING

(71) Applicant: Nanjing University of Science and Technology, Jiangsu (CN)

(72) Inventors: Yan Song, Jiangsu (CN); Rong Zou, Jiangsu (CN); Xiangbo Shu, Jiangsu (CN)

(73) Assignee: NANJING UNIVERSITY OF SCIENCE AND TECHNOLOGY, Nanjing (CN)

(*) Notice: Subject to any disclaimer, the term of this patent is extended or adjusted under 35 U.S.C. 154(b) by 107 days.

(21) Appl. No.: 17/425,653

(22) PCT Filed: Sep. 16, 2020

(86) PCT No.: PCT/CN2020/115542
§ 371 (c)(1),
(2) Date: Jul. 23, 2021

(87) PCT Pub. No.: WO2022/007193
PCT Pub. Date: Jan. 13, 2022

(65) Prior Publication Data
US 2022/0189209 A1 Jun. 16, 2022

(30) Foreign Application Priority Data
Jul. 7, 2020 (CN) .......................... 202010644474.5

(51) Int. Cl.
*G06V 40/20* (2022.01)
*G06V 10/82* (2022.01)
*G06V 10/40* (2022.01)

(52) U.S. Cl.
CPC .............. *G06V 40/23* (2022.01); *G06V 10/40* (2022.01); *G06V 10/82* (2022.01)

(58) Field of Classification Search
CPC ......... G06V 40/23; G06V 10/40; G06V 10/82
See application file for complete search history.

(56) References Cited

U.S. PATENT DOCUMENTS

2020/0302292 A1* 9/2020 Tseng ........................ G06N 3/08

FOREIGN PATENT DOCUMENTS

WO     WO 00/73996    * 12/2000 ............... G06T 7/20

* cited by examiner

*Primary Examiner* — David F Dunphy
(74) *Attorney, Agent, or Firm* — Luedeka Neely Group PC

(57) ABSTRACT

The present disclosure relates to a weakly supervised video activity detection method and system based on iterative learning. The method includes: extracting spatial-temporal features of a video that contains actions; constructing a neural network model group; training a first neural network model according to the class label of the video, a class activation sequence output by the first neural network model, and a video feature output by the first neural network model; training the next neural network model according to the class label of the video, a pseudo temporal label output by the current neural network model, a class activation sequence output by the next neural network model, and a video feature output by the next neural network model; and performing action detection on the test video according to the neural network model corresponding to the highest detection accuracy value.

10 Claims, 5 Drawing Sheets

WEAKLY SUPERVISED VIDEO ACTIVITY DETECTION METHOD AND SYSTEM BASED ON ITERATIVE LEARNING

CROSS REFERENCE TO RELATED APPLICATION(S)

This patent application claims the benefit and priority of Chinese Patent Application No. 202010644474.5 filed on Jul. 7, 2020, the disclosure of which is incorporated by reference herein in its entirety as part of the present application.

TECHNICAL FIELD

The present disclosure relates to the technical field of activity detection, and in particular, a weakly supervised video activity detection method and system based on iterative learning.

BACKGROUND ART

In recent years, activity recognition has been widely studied in the field of computer visions. Its purpose is to automatically analyze collected videos to recognize classes of human actions, so as to realize the analysis and recognition of actions instead of human beings. Video activity recognition is widely used in various video scenarios, such as intelligent monitoring, human-computer interaction, action analysis, and virtual reality. Activity detection is developed from activity recognition. The activity recognition is mainly for trimmed action videos, and the activity detection is mainly for untrimmed action videos, which is more suitable for long videos taken in the real life. The goal of the activity detection is to locate the start time and end time of each action from a long untrimmed video and recognize the class of the action. Specific temporal information of actions in a video needs to be annotated in the activity detection based on full supervision, and manual annotation not only takes a lot of time, but also varies from person to person, so when only knowing which actions the video contains, temporal activity detection based on weak supervision can locate all actions in a video that start from which frame and end at which frame, and recognize the classes of these actions. The temporal activity detection based on weak supervision has a broader application prospect and practical value than pure activity recognition and temporal activity detection based on full supervision.

At present, most weakly supervised temporal activity detection methods are to perform feature extraction on a video based on a deep convolutional neural network, use multi-instance learning or an attention mechanism to output a score that has a high response to actions from a class activation sequence to classify video actions, construct a localization network for a relationship between action structures, action features or actions and backgrounds to learn and update the class activation sequence, and finally perform localization according to the class activation sequence. These methods still have certain problems. They fail to mine locating information and semantic information potentially contained in the class activation sequence, resulting in relatively low localization accuracy.

SUMMARY

The purpose of the present disclosure is to provide a weakly supervised video activity detection method and system based on iterative learning, which can accurately locate and detect actions in a video.

To achieve the above-mentioned purpose, the present disclosure provides the following solution:

A weakly supervised video activity detection method based on iterative learning includes:

extracting spatial-temporal features of a video that contains actions, the spatial-temporal features being divided into the spatial-temporal features in the training set and the spatial-temporal features in the test set;

constructing a neural network model group, the neural network model group containing at least two neural network models, an input of each neural network model being the spatial-temporal feature in the training set, and an output of each neural network model being a class activation sequence, a pseudo temporal label and a video feature of the spatial-temporal feature in the training set in the corresponding neural network model;

training a first neural network model according to the class label of the video, the class activation sequence output by the first neural network model, and the video feature output by the first neural network model, the first neural network model being the first neural network model in the neural network model group;

training the next neural network model according to the class label of the video, the pseudo temporal label output by the current neural network model, the class activation sequence output by the next neural network model, and the video feature output by the next neural network model;

inputting the spatial-temporal features in the test set to the various neural network models, and respectively performing action detection on each corresponding test video in a test set according to the class activation sequences output by the various neural network models to obtain the detection accuracy of the various neural network models; and performing action detection on the test video according to the neural network model corresponding to the highest detection accuracy value.

Optionally, the step of training a first neural network model according to the class label of the video, the class activation sequence output by the first neural network model, and the video feature output by the first neural network model is specifically as follows:

calculating classification loss of the video and the video similarity loss according to the class label of the video, the class activation sequence output by the first neural network model, and the video feature output by the first neural network model; and updating parameters of the first neural network model according to the classification loss and the similarity loss.

Optionally, the step of training the next neural network model according to the class label of the video, the pseudo temporal label output by the current neural network model, the class activation sequence output by the next neural network model, and the video feature output by the next neural network model is specifically as follows:

calculating classification loss of the video according to the class label of the video and the class activation sequence output by the next neural network model;

calculating a fused feature according to the pseudo temporal label output by the current neural network model and the video feature output by the next neural network model;

calculating the video similarity loss according to the fused feature of the video and the class activation sequence output by the next neural network model;

calculating temporal loss of the video according to the pseudo temporal label output by the current neural network model and the class activation sequence output by the next neural network model; and updating parameters of the next neural network model according to the classification loss, the similarity loss, and the temporal loss.

Optionally, the step of extracting spatial-temporal features of a video that contains actions is specifically as follows: extracting, according to a pre-trained network model I3D, the spatial-temporal features of the video that contains the actions.

Optionally, the first neural network model includes a fully connected layer with N nodes, a linear rectification layer, a random deactivation layer and a fully connected layer with C nodes, where N is the feature dimension of each clip after a video in the training set is segmented into clips, and C is a total quantity of classes of all videos in a training set.

Optionally, the step of performing action detection on the test video according to the neural network model corresponding to the highest detection accuracy value is specifically as follows:

extracting spatial-temporal features of the test video;

inputting the spatial-temporal features of the test video to the neural network model corresponding to the highest detection accuracy value, and outputting a class activation sequence;

acquiring a classification score of the test video according to the class activation sequence;

selecting a predicted class that contains an action to be detected from the test video according to the classification score;

selecting an activation sequence corresponding to the predicted class from the class activation sequence; and selecting, according to the activation sequence, candidate action segments that contain the action to be detected.

A weakly supervised video activity detection system based on iterative learning includes:

a spatial-temporal feature extraction module, configured to extract spatial-temporal features of a video that contains actions, the spatial-temporal features being divided into the spatial-temporal features in the training set and the spatial-temporal features in the test set;

a neural network model group construction module, configured to construct a neural network model group, the neural network model group including at least two neural network models, an input of each neural network model being the spatial-temporal feature in the training set, and an output of each neural network model being a class activation sequence, a pseudo temporal label and a video feature of the spatial-temporal feature of the training set in the corresponding neural network model;

a first training module, configured to train a first neural network model according to the class label of the video, the class activation sequence output by the first neural network model, and the video feature output by the first neural network model, the first neural network model being the first neural network model in the neural network model group;

an iterative training module, configured to train the next neural network model according to the class label of the video, the pseudo temporal label output by the current neural network model, the class activation sequence output by the next neural network model, and the video feature output by the next neural network model;

an accuracy detection module, configured to input the spatial-temporal features in the test set into the various neural network models, and respectively perform action detection on each corresponding test video in a test set according to the class activation sequences output by the various neural network models to obtain the detection accuracy of the various neural network models; and an action detection module, configured to perform action detection on the test video according to the neural network model corresponding to the highest detection accuracy value.

Optionally, the first training module includes:

a loss calculation unit, configured to calculate classification loss of the video and the video similarity loss according to the class label of the video, the class activation sequence output by the first neural network model, and the video feature output by the first neural network model; and a first update unit, configured to update parameters of the first neural network model according to the classification loss and the similarity loss.

Optionally, the iterative training module includes:

a classification loss calculation unit, configured to calculate classification loss of the video according to the class label of the video and the class activation sequence output by the next neural network model;

a fused feature calculation unit, configured to calculate a fused feature according to the pseudo temporal label output by the current neural network model and the video feature output by the next neural network model;

a similarity loss calculation unit, configured to calculate similarity loss of the video according to the fused feature of the video and the class activation sequence output by the next neural network model;

a temporal loss calculation unit, configured to calculate temporal loss of the video according to the pseudo temporal label output by the current neural network model and the class activation sequence output by the next neural network model; and a second update unit, configured to update parameters of the next neural network model according to the classification loss, the similarity loss, and the temporal loss.

Optionally, the action detection module includes:

a feature extraction unit, configured to extract spatial-temporal features of a test video;

a class activation sequence output unit, configured to input the spatial-temporal features of the test video to the neural network model corresponding to the highest detection accuracy value, and output a class activation sequence;

a classification score acquisition unit, configured to acquire a classification score of the test video according to the class activation sequence;

a predicted class selection unit, configured to select a predicted class that contains an action to be detected from the test video according to the classification score;

an activation sequence selection unit, configured to select an activation sequence corresponding to the predicted class from the class activation sequence; and a candidate action segment selection unit, configured to select, according to the activation sequence, candidate action segments that contain the action to be detected.

According to the specific embodiments provided by the present disclosure, the present disclosure discloses the following technical effects.

The present disclosure provides a weakly supervised video activity detection method and system based on iterative learning, the method including: extracting spatial-temporal features of a video that contains actions; constructing a neural network model group; training a first neural network model according to the class label of the video, the class activation sequence output by the first neural network model, and the video feature output by the first neural network model; training the next neural network model according to the class label of the video, the pseudo temporal label output by the current neural network model, the class activation sequence output by the next neural network model, and the video feature output by the next neural network model; inputting the spatial-temporal features in the test set into the various neural network models, and respectively performing action detection on each corresponding test video in a test set according to the class activation sequences output by the various neural network models to obtain the detection accuracy of the various neural network models; and performing action detection on the test video according to the neural network model corresponding to the highest detection accuracy value. In the present disclosure, the next neural network model is trained according to the pseudo temporal label information output by the current neural network model, so that the class activation sequence learned by the neural network model is more accurate, and actions in the video can be detected accurately.

BRIEF DESCRIPTION OF THE DRAWINGS

In order to describe the embodiments of the present disclosure or technical solutions in the existing art more clearly, drawings required to be used in the embodiments will be briefly introduced below. Apparently, the drawings in the descriptions below are only some embodiments of the present disclosure. Those ordinarily skilled in the art also can acquire other drawings according to these drawings without creative work.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments of the present disclosure, all other embodiments obtained by those ordinarily skilled in the art without creative work shall fall within the protection scope of the present disclosure.

The purpose of the present disclosure is to provide a weakly supervised video activity detection method and system based on iterative learning, which can accurately locate and detect actions in a video.

In order to make the above-mentioned purposes, features and advantages of the present disclosure more obvious and understandable, the present disclosure is further described in detail below with reference to the accompanying drawings and specific implementation modes.

Embodiment 1

Figure 1:
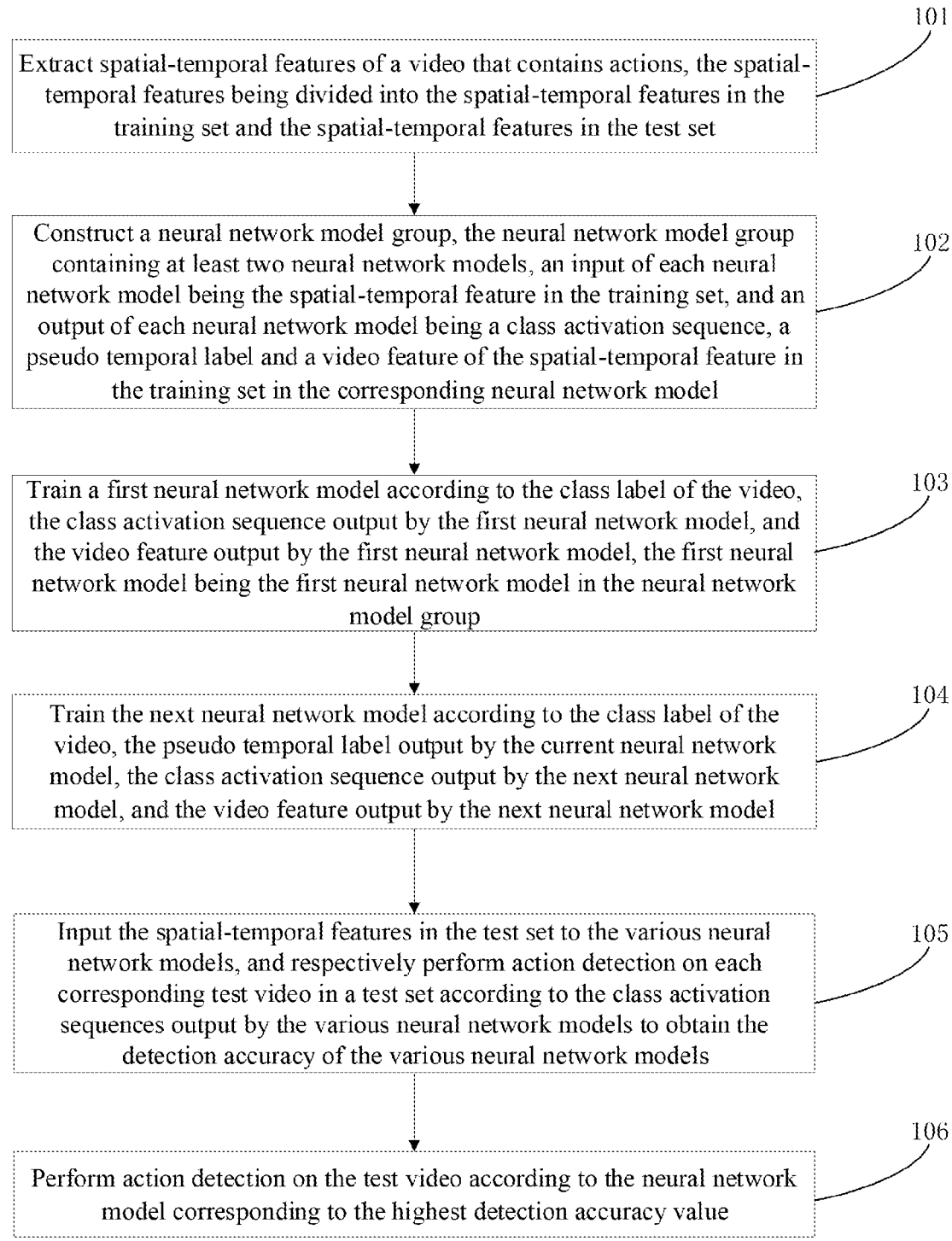
FIG. 1 is a flowchart of a weakly supervised video activity detection method based on iterative learning provided by the embodiments of the present disclosure.
Figure 2:
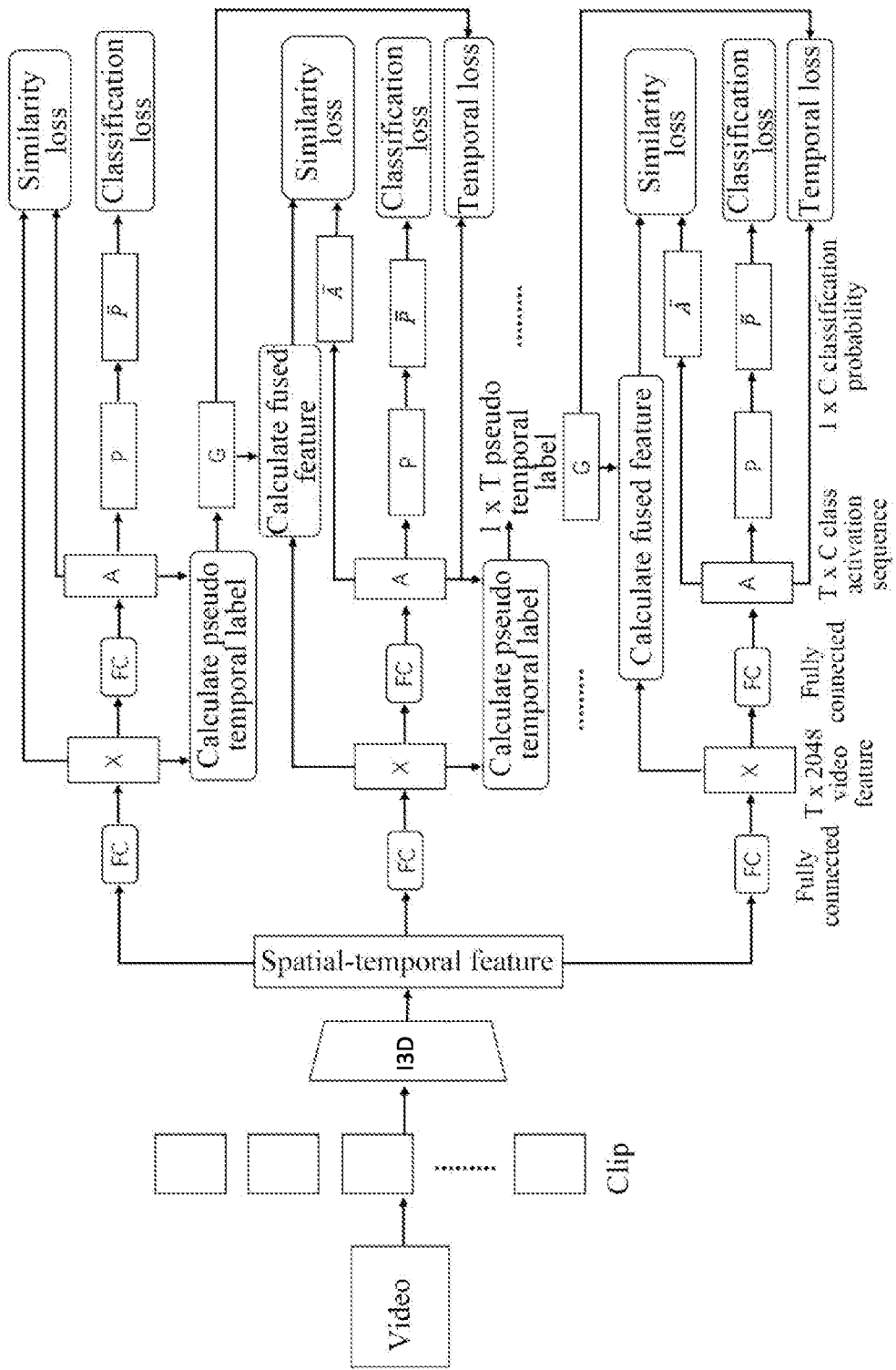
FIG. 2 is a process diagram of a weakly supervised video activity detection method based on iterative learning provided by the embodiments of the present disclosure.

FIG. 1 is a flowchart of a weakly supervised video activity detection method based on iterative learning provided by the embodiments of the present disclosure. FIG. 2 is a process diagram of a weakly supervised video activity detection method based on iterative learning provided by the embodiments of the present disclosure. As shown in FIG. 1 and FIG. 2, the method includes the following.

Step 101: spatial-temporal features of a video that contains actions are extracted. The spatial-temporal features are divided into spatial-temporal features in the training set and spatial-temporal features in the test set. In the present embodiment, specifically, for a given video v, a frame and optical flow of the video v are extracted first; an I3D model that is pre-trained by kinetics dataset is then used to extract the spatial-temporal features $S_v \in \mathfrak{R}^{T_v*N}$ of the video from the frame and the optical flow, where $T_v$ is the number of clips that all frames of the video v are segmented into, and N is the feature dimension of each clip, N=2048.

Step 102: a neural network model group is constructed. The neural network model group includes at least two neural network models; an input of each neural network model is the spatial-temporal feature in the training set, and an output of each neural network model is a class activation sequence, a pseudo temporal label and a video feature of the spatial-temporal feature in the training set in the corresponding neural network model.

Step 103: a first neural network model is trained according to the class label of the video, the class activation sequence output by the first neural network model, and the video feature output by the first neural network model. The first neural network model is the first neural network model in the neural network model group.

In the present embodiment, the first neural network model includes a fully connected layer with N nodes, a linear rectification layer, a random deactivation layer and a fully connected layer with C nodes, where N is a feature dimension of each clip after video frames in the spatial-temporal features in the training set are segmented into clips, and C is a total quantity of classes of all videos in a training set. The process of training the first neural network model includes the following.

Step 1031: classification loss of the video and the video similarity loss are calculated according to the class label of the video, the class activation sequence output by the first neural network model, and the video feature output by the first neural network model. In the present embodiment, step 1031 specifically includes the following steps.

Step 10311: the spatial-temporal features $S_v$ of the video v in the training set are input to the fully connected layer with 2048 nodes, the linear rectification layer, and the random deactivation layer to obtain video features $X_v \in \mathfrak{R}^{T_v*N}$ related to a detection task.

The video features $X_v \in \mathfrak{R}^{T_v*N}$ are input to the fully connected layer with C nodes to obtain a class activation sequence $A_v \in \mathfrak{R}^{T_v*C}$ video.

Top k scores are selected for the activation sequence $A_v^C$ corresponding to each class c according to the class activation sequence $A_v \in \mathfrak{R}^{T_v*C}$ of the video v and are averaged to obtain a classification score $P_v=\{p_v^c\}_{c=1}^C \in \Re^{T*C}$ corresponding to the video, where $K=\lceil T_v/8 \rceil$. The classification score undergoes the softmax function to obtain a classification probability $$\tilde{p}_v = (\tilde{p}_v^c -)_{c=1}^C,$$

and a calculation formula is as follows:

$$\tilde{p}_v^c = \frac{\exp(p_v^c)}{\sum_{c=1}^{C}\exp(p_v^{c'})} \quad (1)$$

where C is a total quantity of action classes of all the videos in the training set.

The class label $Y_v=\{y_v^c\}_{c=1}^C$ of the video and the classification probability $\tilde{p}_v$ are input to defined classification loss to obtain classification loss. A calculation formula is as follows:

$$L_{class} = -\frac{1}{B}\sum_{v=1}^{B}\sum_{c=1}^{C}\tilde{y}_v^c\log(\tilde{p}_v^c) \quad (2)$$

where $L_{class}$ is the classification loss of all the videos in the training set, and B is a batch size, $\tilde{Y}_v = Y_v/\|Y_v\|_1$.

Step 10312: an activation sequence $A_v^j$ corresponding to the real class j of the video according to the class activation sequence $A_v \in \Re^{T_v*C}$ of the video, and the softmax function is then used to obtain a class-aware attention weight $\tilde{A}_v^j$. A calculation formula is as follows:

$$\tilde{A}_v^{j,t} = \frac{\exp(A_v^{j,t})}{\sum_{t'=1}^{T_v}\exp(A_v^{j,t'})} \quad (3)$$

The attention weight $$\tilde{A}_v^j$$

is then used to calculate a high-weight feature region $H^j$ that contains an action j and a low-weight feature region $L^j$ that does not contain the action j in the video feature X, and calculation formulas are as follows:

$$H^j(v) = X_v * \tilde{A}_v^j \quad (4)$$

$$L^j(v) = \frac{X_v(1 - \tilde{A}_v^j)}{T_v - 1} \quad (5)$$

For a video pair (m, n) that contains the same action j, formula (4) and formula (5) are used to respectively calculate a high weight feature $H^j(m)$ and a low weight feature $L^j(m)$ of the video m, and a high weight feature $H^j(n)$ and a low weight feature $L^j(n)$ of the video n. Then, according to the formula:

$$D[m, n] = 1 - \frac{\overrightarrow{X^j}(m) * \overrightarrow{X^j}(n)}{\|X^j(m)\| * \|X^j(n)\|} \quad (6)$$

Cosine similarity is used to measure a similarity between the two feature values $X^j(m)$ and $X^j(n)$, i.e., a similarity $D^H[m,n]$ between $H^j(m)$ and $H^j(n)$, a similarity $D^L[m,n]$ between $H^j(m)$ and $L^j(n)$, and a similarity $D^L[n,m]$ between $H^j(n)$ and $L^j(m)$. Since feature vectors of the same action are similar, and feature vectors of an action and a background are different, the hinge loss function is used to enlarge the difference between the action and the background, thus obtaining the similarity loss of the video, and a specific formula is as follows:

$$L_{simi} = \frac{1}{C}\sum_{j=1}^{C}\frac{1}{\binom{s^j}{2}}\sum_{m,n\in s}\frac{1}{2}\max\left(0, D^H[m,n] - D^L[m,n] + \frac{1}{2}\right) + \quad (7)$$

$$\max\left(0, D^H[m,n] - D^L[n,m] + \frac{1}{2}\right)$$

where $L_{simi}$ is the similarity loss of all the videos in the training set, and $S^j$ is a set of all the videos that contain the action j in the training set.

Step 1032: parameters of the first neural network model are updated according to the classification loss and the similarity loss. Specifically, the parameters of the first neural network model are updated by using total loss $L_0$, where $L_0=\gamma L_{class}+(1-\gamma)*L_{simi}$, and the coefficient $\gamma=0.5$.

Step 104: the next neural network model is trained according to the class label of the video, the pseudo temporal label output by the current neural network model, the class activation sequence output by the next neural network model, and the video feature output by the next neural network model.

In the present embodiment, step 104 specifically includes the following steps.

Step 1041: classification loss of the video is calculated according to the class label of the video and the class activation sequence output by the next neural network model. The calculation process is the same as step 10311.

Figure 3:
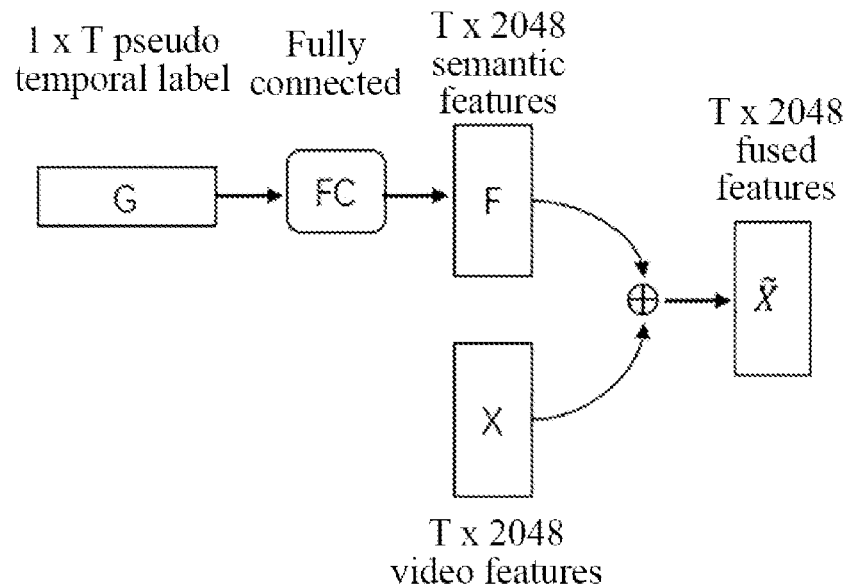
FIG. 3 is a process diagram of acquiring a fused feature provided by the embodiments of the present disclosure.

Step 1042: a fused feature is calculated according to the pseudo temporal label output by the current neural network model and the video feature output by the next neural network model. FIG. 3 is a process diagram of acquiring a fused feature provided by the embodiments of the present disclosure. In the present embodiment, step 1042 specifically includes the following steps.

Step 10421, the highest score $a_{v,r-1}^t$ is selected, according to the class activation sequence $A_{v,r-1} \in \Re^{T_v*C}$ output by the current neural network model, for the activation sequence $A_{v,r-1}^t$ corresponding to each clip t in the video v as a score that the clip t belongs to an action, where r=(1,2, . . . R) is the $r^{th}$ iteration, and R is a total quantity of iterations. In case of r=1, $A_{v,r}$_1 is the class activation sequence output by the first neural network model.

The scores of the actions of all the clips undergo the softmax function to obtain a class independent weight $$\tilde{A}_{v,r-1} = \{\tilde{a}_{v,r-1}^t\}_{t=1}^{T_v} \in \Re^{1*T_v},$$

where $$\tilde{a}^t_{v,r-1}$$

and a calculation formula is as follows:

$$\tilde{a}^t_{v,r-1} = \frac{\exp(a^t_{v,r-1})}{\sum_{t'=1}^{T_v} \exp(a^{t'}_{v,r-1})} \quad (8)$$

Step 10422: the clips having the top h weights are selected as first action clips, where h=⌈T$_v$/9⌉; and feature similarities between each action clip in the first action clips and all the clips in the video are calculated, and a calculation formula is as follows:

$$d[x^m, x^n] = \frac{\vec{x^m} * \vec{x^n}}{\|x^m\| * \|x^n\|} \quad (9)$$

where $x^m$ and $x^n$ are features from among the video features output by the current neural model at the $m^{th}$ and $n^{th}$ clips.

Figure 4:
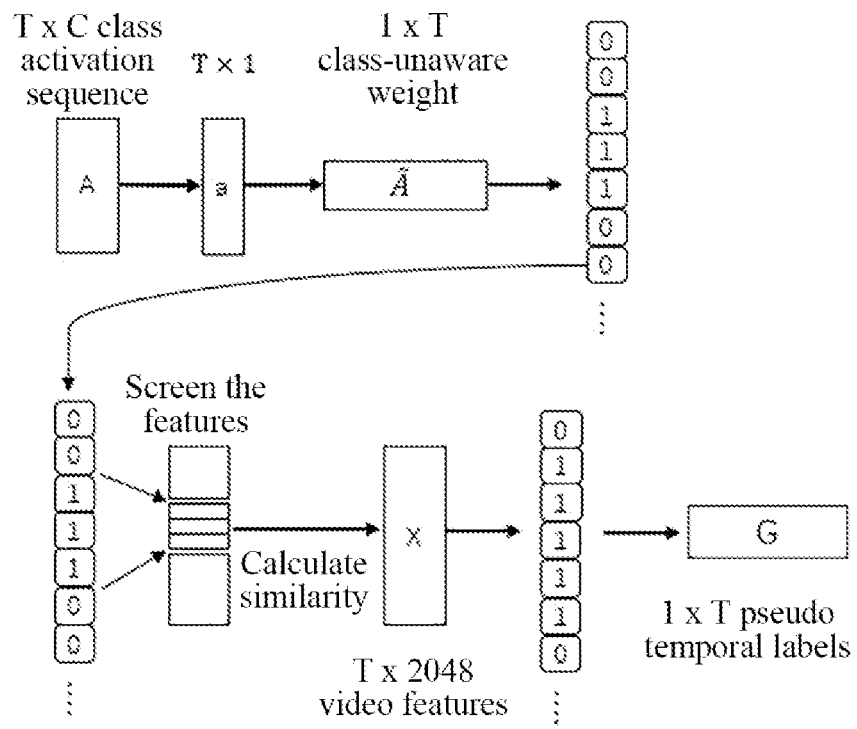
FIG. 4 is a process diagram of outputting a pseudo temporal label provided by the embodiments of the present disclosure.

The clips with the highest similarity and within 2 clips before and after the time of each action clip in the first action clips are selected as the second action clips; positions corresponding to the first action clips and the second action clips are all set to be 1, and the rest positions are set to be 0, thereby obtaining a final pseudo temporal label $G_{v,r-1} = \{g_{v,r-1}^t\}_{t=1}^{T_v}$, where if the clip t is an action clip, $g_{v,r-1}^t = 1$, or $g_{v,r-1}^t = 0$. FIG. 4 is a process diagram of outputting a pseudo temporal label provided by the embodiments of the present disclosure.

Step 10423: the pseudo temporal label $G_{v,r-1} = \{g_{v,r-1}^t\}_{t=1}^{T_v}$ output by the current neural network model is input to the fully connected layer with 2048 nodes to obtain a semantic feature $F_{v,r-1} \in \Re^{T_v*N}$ for distinguishing the action and the background; and the semantic feature and the video feature $X_{v,r} \in \Re^{T_v*N}$ output by the next neural network model are then combined according to a certain ratio to obtain a fused feature $\tilde{X}_{v,r}$ of the video. A fusion formula is:

$$\tilde{X}_{v,r} = X_{v,r} + d * r * F_{v,r-1} \quad (10)$$

where d is a proportionality coefficient, which is set to be 0.1.

Step 1043: the video similarity loss is calculated according to the fused feature of the video and the class activation sequence output by the next neural network model. The calculation process is the same as step 10312. (the video feature in step 10312 is replaced by the fused feature).

Figure 5:
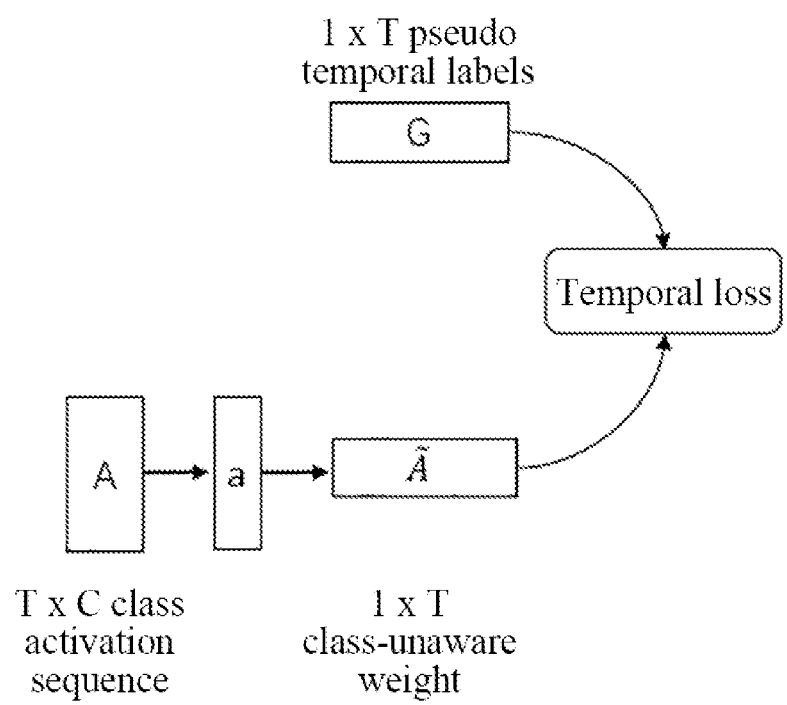
FIG. 5 is a process diagram of calculating a temporal loss provided by the embodiments of the present disclosure.

Step 1044: temporal loss of the video is calculated according to the pseudo temporal label output by the current neural network model and the class activation sequence output by the next neural network model. FIG. 5 is a process diagram of calculating a temporal loss provided by the embodiments of the present disclosure. In the present embodiment, a specific process is as follows:

the class independent weight $\tilde{A}_{v,r}$ is obtained according to the class activation sequence $A_{v,r}$ output by the next neural network model, and the calculation process is the same as step 10421. The pseudo temporal label $G_{v,r-1}$ and the class independent weight $\tilde{A}_{v,r}$ that are output by the current neural network model then undergo temporal loss calculation. A calculation formula is as follows:

$$L^r_{time} = -\frac{1}{B}\sum_{v=1}^{B}\sum_{t=1}^{T_v} \tilde{g}^t_{v,r-1} \log(\tilde{a}^t_{v,r}) \quad (11)$$

Step 1045: parameters of the next neural network model are updated according to the classification loss, the similarity loss, and the temporal loss. Specifically:

the parameters of the next neural network model are updated by using total loss $L_r$, where $L_r = \gamma L_{class}^r + (1-\gamma) * L_{simi}^r + \beta L_{time}^r$, where $L_{class}^r$ is the classification loss calculated in step 1041; $L_{simi}^r$ is the similarity loss calculated in step 1043; $L_{time}^r$ is the temporal loss calculated in step 1044; the coefficient $\gamma$ is 0.5; and the coefficient $\beta$ is 0.05.

Step 105: the spatial-temporal features in the test set are input to the various neural network models, and action detection is performed on each corresponding test video in a test set respectively according to the class activation sequences output by the various neural network models to obtain the detection accuracy of the various neural network models.

Step 106: action detection is performed on the test video according to the neural network model corresponding to the highest detection accuracy value. Specifically:

spatial-temporal features of the test video are extracted, the spatial-temporal features of the test video are input to the neural network model corresponding to the highest detection accuracy value, and a class activation sequence is output; a classification score of the test video is acquired according to the class activation sequence; a predicted class that contains an action to be detected is selected from the test video according to the classification score; in the present embodiment, the class with the classification score greater than 0 can be selected as the predicted class; an activation sequence corresponding to the predicted class is selected from the class activation sequence; and candidate action segments that contain the action to be detected are selected according to the corresponding activation sequence. In the present embodiment, two or more continuous clips with activation values greater than a set threshold can be selected as an action detection result, where the threshold is max (A$^t$)−(max(A$^t$)−min(A$^t$))*0.5, and A$^t$ is the activation sequence corresponding to action i.

Embodiment 2

Figure 6:
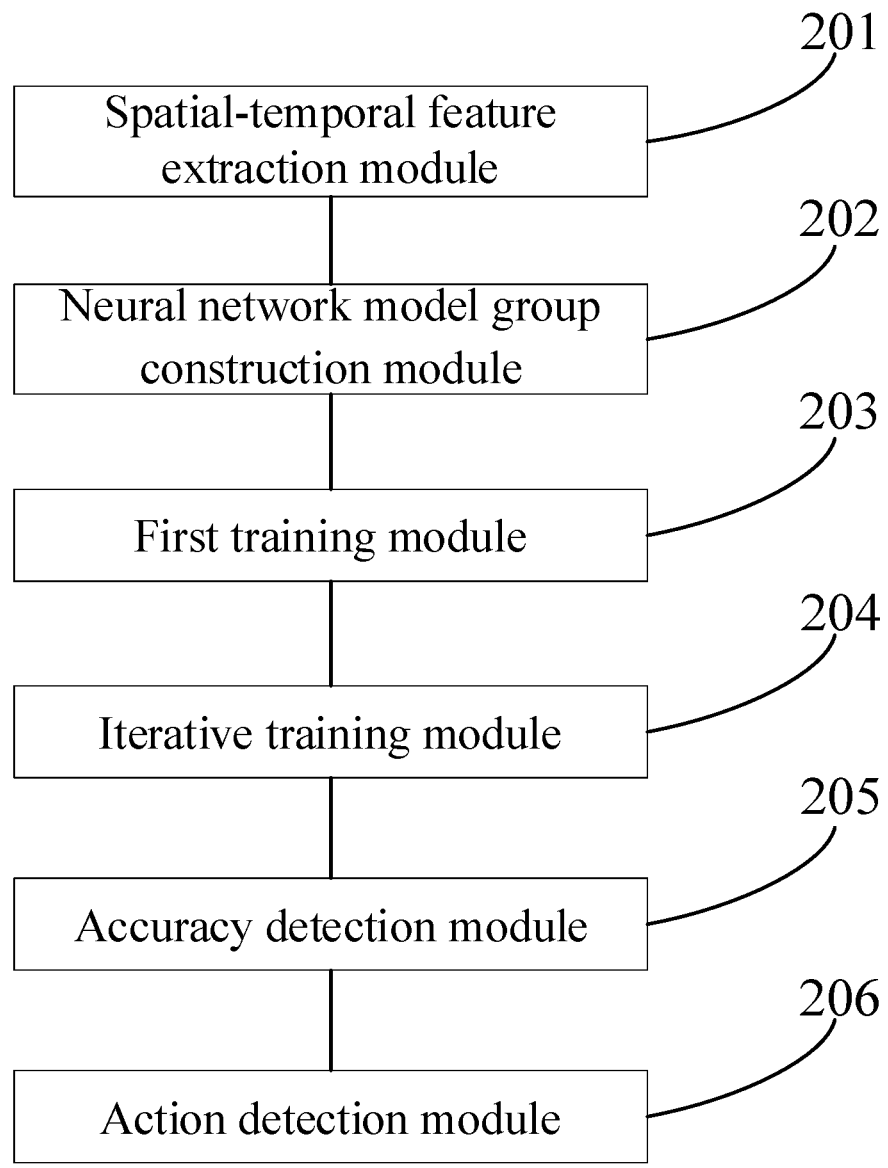
FIG. 6 is a systematic block diagram of a weakly supervised video activity detection system based on iterative learning provided by the embodiments of the present disclosure.

The present disclosure further provides a weakly supervised video activity detection system based on iterative learning. The system is applied to the weakly supervised video activity detection method based on iterative learning of Embodiment 1. FIG. 6 is a systematic block diagram of a weakly supervised video activity detection system based on iterative learning provided by the embodiments of the present disclosure. As shown in FIG. 6, the system includes:

a spatial-temporal feature extraction module 201, configured to extract spatial-temporal features of a video that contains actions, the spatial-temporal features being divided into spatial-temporal features in the training set and spatial-temporal features in the test set;

a neural network model group construction module 202, configured to construct a neural network model group, the neural network model group including at least two neural network models, an input of each neural network model being the spatial-temporal feature in the training set, and an output of each neural network model being a class activation sequence, a pseudo temporal label and a video feature of the spatial-temporal feature in the training set in the corresponding neural network model; and a first training module 203, configured to train a first neural network model according to the class label of the video, the class activation sequence output by the first neural network model, and the video feature output by the first neural network model, the first neural network model being the first neural network model in the neural network model group.

In the present embodiment, the first training module 203 includes:

a loss calculation unit 2031, configured to calculate classification loss of the video and similarity loss of the video according to the class label of the video, the class activation sequence output by the first neural network model, and the video feature output by the first neural network model;

a first update unit 2032, configured to update parameters of the first neural network model according to the classification loss and the similarity loss; and an iterative training module 204, configured to train the next neural network model according to the class label of the video, the pseudo temporal label output by the current neural network model, the class activation sequence output by the next neural network model, and the video feature output by the next neural network model.

In the present embodiment, the iterative training module 204 includes:

a classification loss calculation unit 2041, configured to calculate classification loss of the video according to the class label of the video and the class activation sequence output by the next neural network model;

a fused feature calculation unit 2042, configured to calculate a fused feature according to the pseudo temporal label output by the current neural network model and the video feature output by the next neural network model;

a similarity loss calculation unit 2043, configured to calculate similarity loss of the video according to the fused feature of the video and the class activation sequence output by the next neural network model;

a temporal loss calculation unit 2044, configured to calculate temporal loss of the video according to the pseudo temporal label output by the current neural network model and the class activation sequence output by the next neural network model;

a second update unit 2045, configured to update parameters of the next neural network model according to the classification loss, the similarity loss, and the temporal loss;

an accuracy detection module 205, configured to input the spatial-temporal features in the test set into the various neural network models, and respectively perform action detection on each corresponding test video in a test set according to the class activation sequences output by the various neural network models to obtain the detection accuracy of the various neural network models; and an action detection module 206, configured to perform action detection on the test video according to the neural network model corresponding to the highest detection accuracy value.

In the present embodiment, the action detection module 206 includes:

a feature extraction unit 2061, configured to extract spatial-temporal features of a test video;

a class activation sequence output unit 2062, configured to input the spatial-temporal features of the test video to the neural network model corresponding to the highest detection accuracy value, and output a class activation sequence;

a classification score acquisition unit 2063, configured to acquire a classification score of the test video according to the class activation sequence;

a predicted class selection unit 2064, configured to select a predicted class that contains an action to be detected from the test video according to the classification score;

an activation sequence selection unit 2065, configured to select an activation sequence corresponding to the predicted class from the class activation sequence; and a candidate action segment selection unit 2066, configured to select, according to the activation sequence, candidate action segments that contain the action to be detected.

According to the specific embodiments provided by the present disclosure, the present disclosure discloses the following technical effects.

(1) Supervision information of the pseudo temporal label is iteratively added when the neural network models in the present disclosure are trained, so that the learned class activation sequences are more accurate, and actions are located and detected more accurately.

(2) In the present disclosure, by means of transforming the pseudo temporal label into the semantic features and fusing the semantic features with the video features, the video features are more suitable for a localization task, thereby further improving the localization accuracy.

All the embodiments in the specification are described in a progressive manner. Contents mainly described in each embodiment are different from those described in other embodiments. Same or similar parts of all the embodiments refer to each other. The system disclosed by the embodiments is relatively simply described as it corresponds to the method disclosed by the embodiments, and related parts refer to part of the descriptions of the method.

The principle and implementation modes of the present disclosure are described by applying specific examples herein. The descriptions of the above embodiments are only intended to help to understand the method of the present disclosure and a core idea of the method. In addition, those ordinarily skilled in the art can make changes to the specific implementation modes and the application scope according to the idea of the present disclosure. From the above, the contents of the specification shall not be deemed as limitations to the present disclosure.

What is claimed is:

1. A weakly supervised video activity detection method based on iterative learning, comprising:
extracting spatial-temporal features of a video that contains actions, the spatial-temporal features being divided into the spatial-temporal features in the training set and the spatial-temporal features in the test set;
constructing a neural network model group, the neural network model group containing at least two neural network models, an input of each neural network model being the spatial-temporal feature in the training set, and an output of each neural network model being a class activation sequence, a pseudo temporal label and a video feature of the spatial-temporal feature in the training set in the corresponding neural network model;
training a first neural network model according to the class label of the video, the class activation sequence output by the first neural network model, and the video feature output by the first neural network model, the first neural network model being the first neural network model in the neural network model group;

training the next neural network model according to the class label of the video, the pseudo temporal label output by the current neural network model, the class activation sequence output by the next neural network model, and the video feature output by the next neural network model;

inputting the spatial-temporal features in the test set to the various neural network models, and respectively performing action detection on each corresponding test video in a test set according to the class activation sequences output by the various neural network models to obtain the detection accuracy of the various neural network models; and performing action detection on the test video according to the neural network model corresponding to the highest detection accuracy value.

2. The detection method according to claim 1, wherein the step of training a first neural network model according to the class label of the video, the class activation sequence output by the first neural network model, and the video feature output by the first neural network model is specifically as follows:

calculating classification loss of the video and the video similarity loss according to the class label of the video, the class activation sequence output by the first neural network model, and the video feature output by the first neural network model; and updating parameters of the first neural network model according to the classification loss and the similarity loss.

3. The detection method according to claim 1, wherein the step of training the next neural network model according to the class label of the video, the pseudo temporal label output by the current neural network model, the class activation sequence output by the next neural network model, and the video feature output by the next neural network model is specifically as follows:

calculating classification loss of the video according to the class label of the video and the class activation sequence output by the next neural network model;

calculating a fused feature according to the pseudo temporal label output by the current neural network model and the video feature output by the next neural network model;

calculating similarity loss of the video according to the fused feature of the video and the class activation sequence output by the next neural network model;

calculating temporal loss of the video according to the pseudo temporal label output by the current neural network model and the class activation sequence output by the next neural network model; and updating parameters of the next neural network model according to the classification loss, the similarity loss, and the temporal loss.

4. The detection method according to claim 1, wherein the step of extracting spatial-temporal features of a video that contains actions is specifically as follows: extracting, according to a pre-trained network model I3D, the spatial-temporal features of the video that contains the actions.

5. The detection method according to claim 1, wherein the first neural network model comprises a fully connected layer with N nodes, a linear rectification layer, a random deactivation layer and a fully connected layer with C nodes, wherein N is a feature dimension of each clip after a video in the training set is segmented into clips, and C is a total quantity of classes of all videos in a training set.

6. The detection method according to claim 1, wherein the step of performing action detection on the test video according to the neural network model corresponding to the highest detection accuracy value is specifically as follows:

extracting spatial-temporal features of the test video;

inputting the spatial-temporal features of the test video to the neural network model corresponding to the highest detection accuracy value, and outputting a class activation sequence;

acquiring a classification score of the test video according to the class activation sequence;

selecting a predicted class that contains an action to be detected from the test video according to the classification score;

selecting an activation sequence corresponding to the predicted class from the class activation sequence; and selecting, according to the activation sequence, candidate action segments that contain the action to be detected.

7. A weakly supervised video activity detection system based on iterative learning, comprising:

a spatial-temporal feature extraction module, configured to extract spatial-temporal features of a video that contains actions, the spatial-temporal features being divided into the spatial-temporal features in the training set and the spatial-temporal features in the test set;

a neural network model group construction module, configured to construct a neural network model group, the neural network model group including at least two neural network models, an input of each neural network model being the spatial-temporal feature in the training set, and an output of each neural network model being a class activation sequence, a pseudo temporal label and a video feature of the spatial-temporal feature in the training set in the corresponding neural network model;

a first training module, configured to train a first neural network model according to the class label of the video, the class activation sequence output by the first neural network model, and the video feature output by the first neural network model, the first neural network model being the first neural network model in the neural network model group;

an iterative training module, configured to train the next neural network model according to the class label of the video, the pseudo temporal label output by the current neural network model, the class activation sequence output by the next neural network model, and the video feature output by the next neural network model;

an accuracy detection module, configured to input the spatial-temporal features in the test set into the various neural network models, and respectively perform action detection on each corresponding test video in a test set according to the class activation sequences output by the various neural network models to obtain the detection accuracy of the various neural network models; and an action detection module, configured to perform action detection on the test video according to the neural network model corresponding to the highest detection accuracy value.

8. The detection system according to claim 7, wherein the first training module comprises:

a loss calculation unit, configured to calculate classification loss of the video and the video similarity loss according to the class label of the video, the class activation sequence output by the first neural network model, and the video feature output by the first neural network model; and a first update unit, configured to update parameters of the first neural network model according to the classification loss and the similarity loss.

9. The detection system according to claim 7, wherein the iterative training module comprises:

a classification loss calculation unit, configured to calculate classification loss of the video according to the class label of the video and the class activation sequence output by the next neural network model;

a fused feature calculation unit, configured to calculate a fused feature according to the pseudo temporal label output by the current neural network model and the video feature output by the next neural network model;

a similarity loss calculation unit, configured to calculate the video similarity loss according to the fused feature of the video and the class activation sequence output by the next neural network model;

a temporal loss calculation unit, configured to calculate temporal loss of the video according to the pseudo temporal label output by the current neural network model and the class activation sequence output by the next neural network model; and a second update unit, configured to update parameters of the next neural network model according to the classification loss, the similarity loss, and the temporal loss.

10. The detection system according to claim 7, wherein the action detection module comprises:

a feature extraction unit, configured to extract spatial-temporal features of a test video;

a class activation sequence output unit, configured to input the spatial-temporal features of the test video to the neural network model corresponding to the highest detection accuracy value, and output a class activation sequence;

a classification score acquisition unit, configured to acquire a classification score of the test video according to the class activation sequence;

a predicted class selection unit, configured to select a predicted class that contains an action to be detected from the test video according to the classification score;

an activation sequence selection unit, configured to select an activation sequence corresponding to the predicted class from the class activation sequence; and a candidate action segment selection unit, configured to select, according to the activation sequence, candidate action segments that contain the action to be detected.

* * * * *